United States Patent [19]
Lyon

[11] 3,812,857
[45] May 28, 1974

[54] DIFFERENTIAL BEAK TRIMMER

[76] Inventor: James Lyon, 2922 Qualtruagh St., San Diego, Calif. 92106

[22] Filed: Nov. 30, 1972

[21] Appl. No.: 310,935

[52] U.S. Cl.................. 128/303.1, 128/305, 30/124
[51] Int. Cl......................... A61b 17/36, A61n 3/00
[58] Field of Search..................... 30/124, 131, 134; 128/303.1, 305

[56] References Cited
UNITED STATES PATENTS

| | | | |
|---|---|---|---|
| 2,886,038 | 5/1959 | Lockmiller | 128/305 |
| 3,302,645 | 2/1967 | Lockmiller | 128/305 X |
| 3,390,679 | 7/1968 | Turner | 128/303.1 |

*Primary Examiner*—Channing L. Pace
*Attorney, Agent, or Firm*—Ralph S. Branscomb

[57] ABSTRACT

The apparatus is used for trimming and cauterizing the beaks of fowl and utilizes a heated cutting and cauterizing blade with a cauterizing projection attached thereto so that the blade and the cauterizing element move together across the face of a beak holding means, thereby shearing off and cauterizing the end of the beak while the cauterizing projection passes between the upper and lower halves or mandible and maxilla of the beak. The beak holding means limits the portion of beak exposed to the blade by the size of an aperture through which the beak is protruded, the aperture being adjustable in size to accommodate different sized beaks, and adjustable sideways to permit alignment of the plane between the mandible and maxilla of the beak with the cauterizing projection.

8 Claims, 9 Drawing Figures

PATENTED MAY 28 1974 3,812,857

DIFFERENTIAL BEAK TRIMMER

BACKGROUND OF THE INVENTION

The present invention relates to a beak trimmer for fowl, particularly for trimming the beaks of game birds, such as pheasant, quail and turkeys and chickens on chicken ranches, hatcheries and the like, where a large number of birds must be processed.

It is known in the art of fowl raising that birds in flock, especially chickens, become nervous and indulge in cannibalism, feather pulling and pecking. To prevent injury to the birds, the beaks are trimmed at an early age. The present invention trims and cauterizes the end of the beak and simultaneously cauterizes between the manidible and maxilla. The cauterization kills beak tissue and causes it to slough off permanently so that the beak of an adult bird processed by the machine is not only blunted on the end, but has an open space between the manidible and maxilla at their extremities, thereby eliminating the bird's ability to grasp and pull out feathers of other fowl. The invention is an improvement on a beak trimmer patented by the applicant, Pat. No. 3,450,137 and sold under the trademark "Debeaker", which employed a V-shaped blade to trim and cauterize the parted halves of the beak. That model has two separate apertures in the beak holding means for holding the two beak members and is not adjustable to accomodate different sized beaks.

SUMMARY OF THE INVENTION

The present invention is an improvement in the aforementioned prior model wherein a flat heated cutting blade with at least one orthogonally extending cauterizing projection is used to trim and cauterize the end of the beak and cauterize between the beak halves while both halves are projecting through a single adjusted aperture in a beak holding means. The aperture in the beak holding means is adjustable both laterally with respect to the cauterizing projection and size-wise to accommodate different sized beaks. A plurality of different sized, adjustable apertures can be added to the beak holding means for use with a blade with plural cauterizing projections to reduce the number of occasions in which adjustment is necessary.

DETAILED DESCRIPTION OF A PREFERRED EMBODIMENT

Figure 1:
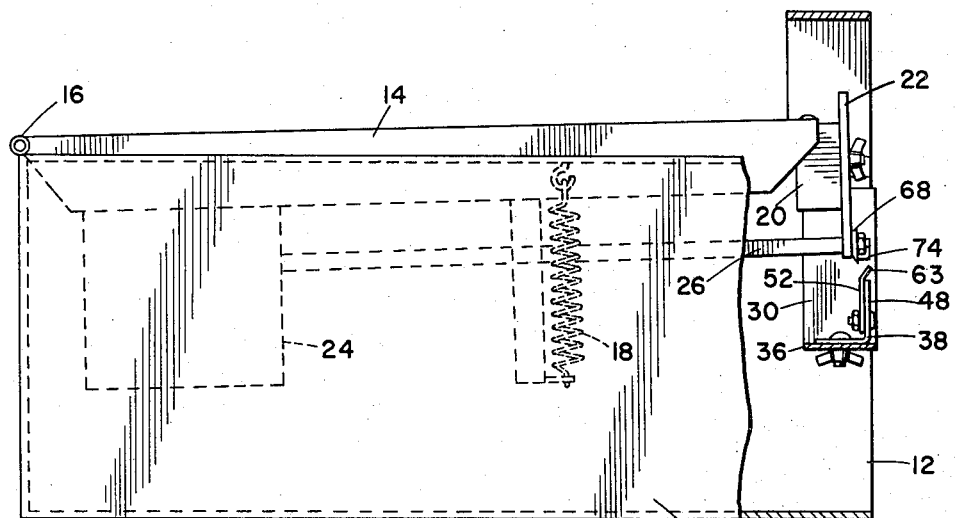
FIG. 1 is a side elevation view partially cut away, of a trimming machine incorporating the cutter assembly.
Figure 2:
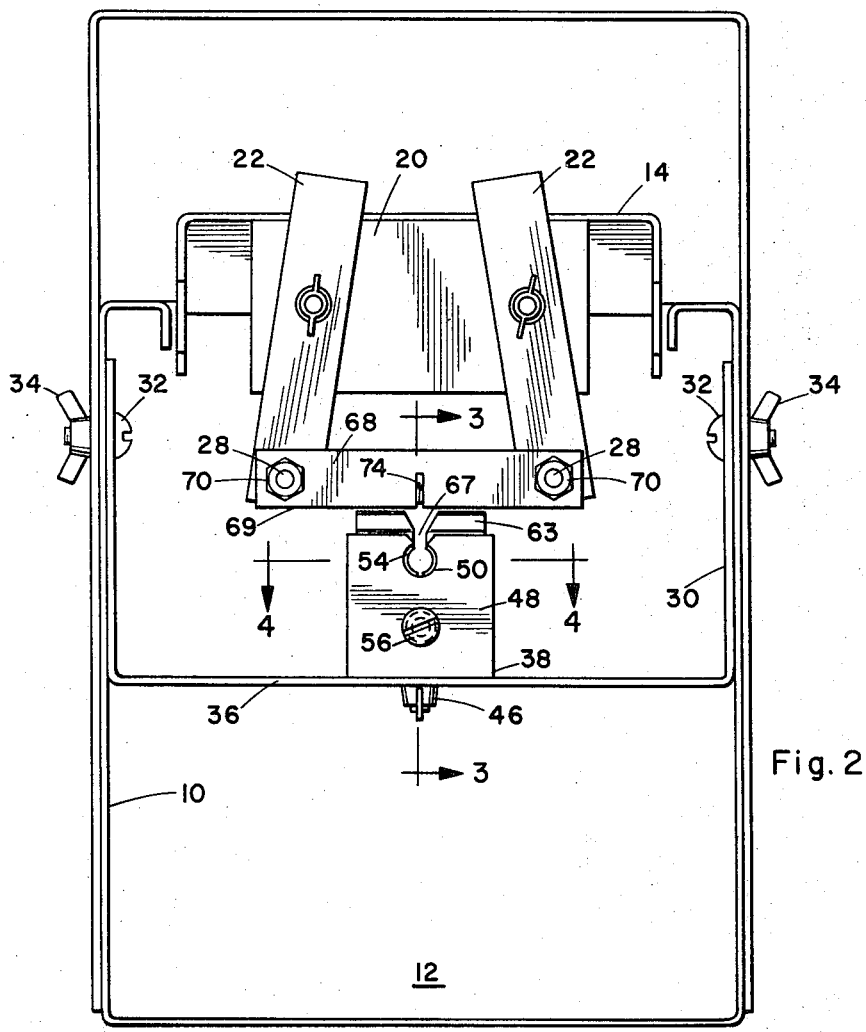
FIG. 2 is an enlarged end view of the machine as taken from the right hand end of FIG. 1.
Figure 3:
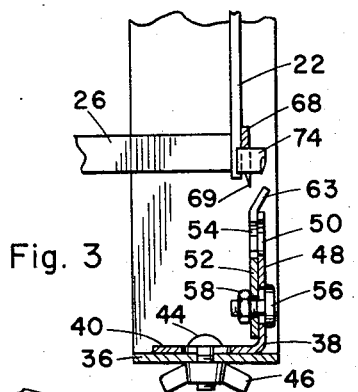
FIG. 3 is an enlarged sectional view taken on line 3—3 of FIG. 2.

The beak trimming machine shown in an example is of the type sold under the "Debeaker" trademark, memtioned above and shown only in sufficient detail to support the new trimmer structure. Such a machine, described in U.S. Pat. Nos. 2,359,569, and 2,385,633, and 3,450,137, and other types in the same line, vary in mechanical detail, but the basic principal is well known.

The machine has a rectangular box-like casing 10 open at the front end 12 and provided with a cover member 14 which is attached to the casing at the rear end by a hinge 16. Cover member 14 is supported from casing 10 by spring means 18 and is pressed down against the spring means for the beak cutting action, usually by a foot pedal (not shown) to leave both of the operator's hands free to handle the bird. Fixed to the underside of the front end of cover member 14 is an insulating block 20 on which are attached two downwardly extending, laterally spaced support arms 22. Mounted on cover member 14 is a transformer 24, or similar power supply means, from which heavy bus bars 26 extend to the support arms 22 and have threaded studs 28 projecting through the support arms. In the open front end 12 of the casing a V-bracket is mounted by screws 32 and wingnuts 34 and is adjustable from front to rear. Thus far the structure is conventional and may vary in detail.

Bracket 30 has a cross bar 36 on top of which is mounted an L-shaped resilient anchor plate 38 with a horizontal portion 40 having a slotted hole 42 through which the anchor plate is bolted to the cross bar by screw 44 and wing nut 46.

Figure 7:
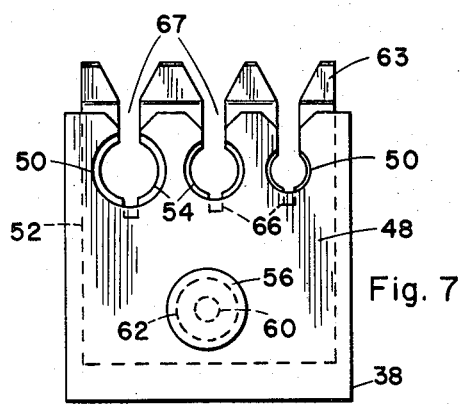
FIG. 7 is a front view of a multiple aperture beak holder.

The anchor plate has a vertical portion 48 with an aperture 50 through which a beak is inserted for processing, the portion of the beak exposed to the cutting blade (described below) being limited by the size of the aperture. In order to vary the size of the aperture to accomodate different beak sizes, a strike plate 52 with an aperture 54 smaller than aperture 50 is fastened against the anchor plate by a screw 56 with a nut 58. To accomodate the screw 56 there is a hole 60 in the strike plate and a larger hole 62 in the anchor plate. By loosening nut 58 and sliding the strike plate on the anchor plate, a variable-sized effective hole is established through both plates whereby smaller beaks can be processed. The beak holding means may include multiple different-sized apertures as shown in FIG. 7, wherein several different beak sizes can be accomodated without adjustment and if further variation is required, simultaneous adjustment of all apertures can be accomplished in the fashion just mentioned, with the resulting configuration illustrated in FIG. 8.

Strike plate 52 has a curved or angulated upper portion 63 and two flanged lower corners 64 to grip the anchor plate. For purposes made clear hereinafter, there is a clearance slot 66 at the bottom of aperture 54 in strike plate 52, and a combined openings 67 at the top of both apertures 50 and 54.

Figure 5:
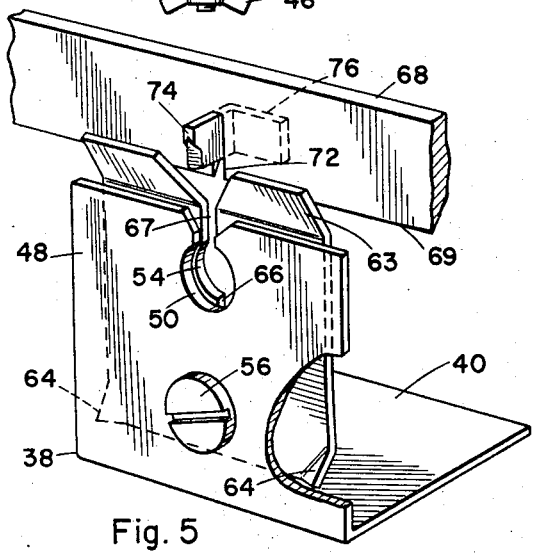
FIG. 5 is a perspective view of the principal components of the cutter assembly.
Figure 8:
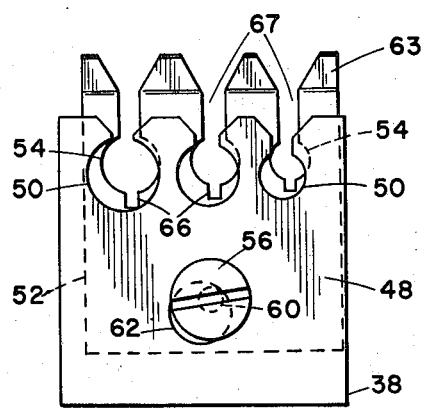
FIG. 8 is a view similar to FIG. 7, but with the strike plate offset.
Figure 9:
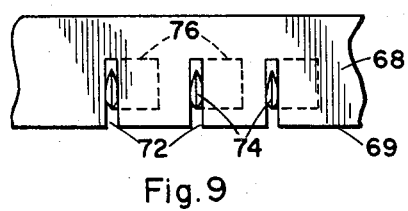
FIG. 9 is a fragmentary front elevational view of a cutting blade with three cauterizing projections.

A cutting and cauterizing blade 68 with a beveled lower cutting edge 69 is attached to the support arms 22 by nuts 70 screwed onto studs 28, thereby completing the electrical circuit between bus bars 26. There is a slot 72 in the cutting blade through which projects one leg of L-shaped cauterizing projection 74, with the other leg 76 affixed to the back of the cutting blade as shown in FIG. 5. An electrical current is passed through the cutting blade 68 which is heated by ohmic resistance or otherwise and in turn conductively heats cauterizing projection 74 through the broad heat transfer surface provided by leg 76. If a multiple apertured beak holding means shown in FIG. 7 and 8 is used, the cutting blade will have multiple cauterizing projections 74 as shown in FIG. 9, spot welded or otherwise affixed thereto.

Figure 4:
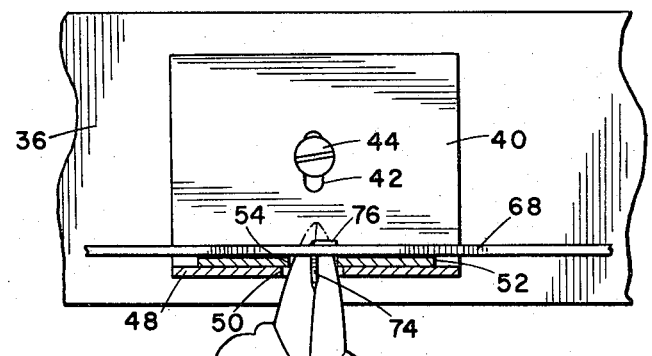
FIG. 4 is an enlarged sectional view taken on line 4—4 of FIG. 2.
Figure 6:
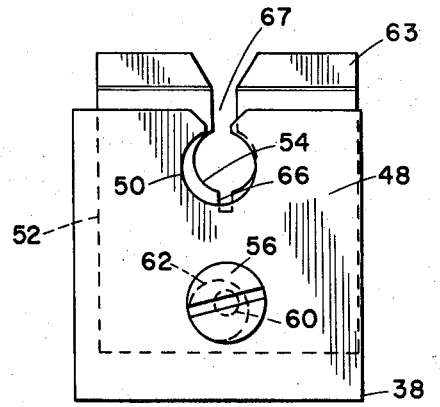
FIG. 6 is a front view of the beak holder portion of the assemble with the strike plate offset.

In the operation of the apparatus, the heated cutting blade is swung down in a cutting strike, grazing the curved portion 63 of strike plate 52 and slightly displacing resilient anchor plate 38, which urges the strike plate against the cutting blade to insure that the shearing action is clean. As the blade progresses downward across the surface of strike plate 52, cauterizing projection 74 passes through the opening 67 at the top of the apertures 50 and 54 in the strike plate and anchor plate, and then between the "mandible and maxilla" of a beak held in the aperture, shown in FIG. 4, and into the clearance slot 66 to insure complete cauterization. If it is found that the plane of descent of the cauterizing projection does not coincide with the plane between the mandible and maxilla of a particular beak, a lateral adjustement of strike plate 52 on the anchor plate, shown in FIG. 6 and 8, will bring the planes into alignment. As the cutting blade shears off and cauterizes the end of the beak, the cauterizing projection 74 sears a channel through the sheared mandible and maxilla at their interface, and the process is completed. "Thus the end of the beak is provided with a slot or gap in the distal end thereof when it is closed as shown in FIG. 4, making if difficult for the bird to pluck the feathers of other birds or otherwise injure them. The sharp inner edges of the beaks slough off in time, giving the interior ends of the mandible and maxilla a rounded appearance."

I claim:

1. A beak trimming device comprising:
   a frame;
   a beak holding means mounted on said frame;
   a heated cutting blade operably mounted on said frame;
   a means to move said blade relative to said beak holding means in a cutting stroke; and
   at least one cauterizing projection attached to said blade and extending substantially normal thereto on the side thereof adjacent to said beak holding means, said cauterizing projection being conductively heated by said blade and disposed thereon in a position which is substantially aligned with the interface between the mandible and maxilla of a beak held in the beak holding means during the cutting stroke, whereby the cauterizing projection can sear a channel through the adjacent surfaces of the mandible and maxilla and cauterize these surfaces simultaneously with the trimming of the beak.

2. The structure of claim 1 wherein said beak holding means comprises a substantially planar structure generally parallel to the stroke of said heated blade, said structure having an aperture for the insertion of a beak, said aperture being open at the top to accomodate said cauterizing projection during the cutting stroke.

3. The structure of claim 2 wherein said aperture has a clearance slot at the bottom to further accommodate said cauterizing projection to insure complete contact between the cauterizing element and a beak held in said aperture.

4. The structure of claim 1 wherein said beak holding means has a beakreceiving aperture and including means to vary the effectie size of said aperture.

5. In a beak trimming machine having an operatively mounted cutting blade and a beak holding means in which the portion of a tapered beak exposed to said cutting blade is limited by the diameter of an aperture in the beak holding means through which the beak is inserted, an improved beak holding means comprising:

an anchor plate with an aperture therein;
   a strike plate with an aperture therein;
   a fastening means whereby said strike plate is adjustably fastened on said anchor plate in face to face contact with the apertures partially aligned to produce an effective aperture whose size can be varied by a sliding adjustment of the strike plate on the anchor plate.

6. The structure in claim 5 wherein said anchor plate has a plurality of different sized apertures and said strike plate has a plurality of correspondingly positioned and dimensioned apertures whereby a single adjustment of said strike plate can achieve a concomitant adjustment of a plurality of effective apertures.

7. The structure in claim 5 wherein said anchor plate is slightly resilient and said strike plate defines a shearing surface on one side thereof for said cutting blade, the portion of said strike plate first to meet said cutting blade during the shearing stroke having a lip curving away from said one side to insure proper cooperation between said strike plate and blade during the cutting stroke.

8. The structure in claim 5 wherein said strike plate has a gripping means engaging said anchor plate to prevent accidental sliding after adjustment.

* * * * *